US012681484B2

(12) United States Patent
    Matsuda

(10) Patent No.: US 12,681,484 B2
(45) Date of Patent: Jul. 14, 2026

(54) WORK SUPPORT SYSTEM, AUTONOMOUS MOVABLE BODY FOR WORK SUPPORT, AND WORK SUPPORT METHOD

(71) Applicant: KAWASAKI JUKOGYO KABUSHIKI KAISHA, Kobe (JP)

(72) Inventor: Yoshimoto Matsuda, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 71 days.

(21) Appl. No.: 18/688,504

(22) PCT Filed: Sep. 29, 2022

(86) PCT No.: PCT/JP2022/036424
    § 371 (c)(1),
    (2) Date: Mar. 1, 2024

(87) PCT Pub. No.: WO2023/058549
    PCT Pub. Date: Apr. 13, 2023

(65) Prior Publication Data
    US 2024/0402716 A1     Dec. 5, 2024

(30) Foreign Application Priority Data
    Oct. 5, 2021    (JP) ................................. 2021-164304

(51) Int. Cl.
    *G05D 1/224*         (2024.01)
    *G05D 1/646*         (2024.01)
    (Continued)

(52) U.S. Cl.
    CPC ........... *G05D 1/2247* (2024.01); *G05D 1/646* (2024.01); *G05D 2105/20* (2024.01); *G05D 2105/85* (2024.01); *G05D 2111/32* (2024.01)

(58) Field of Classification Search
    CPC ........... G05D 2105/85; G05D 2105/20; G05D 2111/32; G05D 1/646; G05D 1/2247
    (Continued)

(56) References Cited

U.S. PATENT DOCUMENTS 10,814,976 B2 * 10/2020 Flood ..................... A01G 23/00
    12,094,145 B2 * 9/2024 Ebrahimi Afrouzi ... G06T 7/136
    (Continued)

FOREIGN PATENT DOCUMENTS

JP        2002041124 A       2/2002
    JP        2003150236 A       5/2003
    (Continued)

*Primary Examiner* — Yazan A Soofi
(74) *Attorney, Agent, or Firm* — Alleman Hall LLP

(57) ABSTRACT

Server processing circuitry is configured to: determine a work site that requires work; and transmit site information indicating the work site, to a movable body communicator. Movable body processing circuitry is configured to: receive the site information from a management server through the movable body communicator; generate based on the site information a movement command for making an autonomous movable body autonomously move to the work site; acquire support information for the work at the work site; and output the support information to a worker through a man-machine interface when the autonomous movable body has arrived at the work site.

15 Claims, 8 Drawing Sheets

(51) Int. Cl.
  *G05D 105/20* (2024.01)
  *G05D 105/85* (2024.01)
  *G05D 111/30* (2024.01)

(58) Field of Classification Search
  USPC .......................................................... 701/23
  See application file for complete search history.

(56) References Cited

U.S. PATENT DOCUMENTS

| | | | | |
|---|---|---|---|---|
| 2007/0090178 | A1* | 4/2007 | Fujii ................... | G05B 23/0264 |
| | | | | 235/375 |
| 2019/0087768 | A1* | 3/2019 | Fujimura ....... | G06Q 10/063112 |
| 2019/0100310 | A1* | 4/2019 | Flood ..................... | A01G 23/00 |
| 2020/0050206 | A1 | 2/2020 | Deyle et al. | |
| 2020/0278678 | A1* | 9/2020 | Takenaka ............... | G05D 1/104 |
| 2022/0325500 | A1* | 10/2022 | Pennagaram Hemanth ................ | |
| | | | | G05D 1/0016 |

| | | | | |
|---|---|---|---|---|
| 2023/0054376 | A1* | 2/2023 | Flitsch ................... | B33Y 50/02 |
| 2023/0236604 | A1* | 7/2023 | Frick .................... | G05D 1/0246 |
| | | | | 701/23 |
| 2024/0219925 | A1* | 7/2024 | Barboi ................ | G05D 1/0016 |
| 2024/0255958 | A1* | 8/2024 | Cristache ............ | G05D 1/6987 |

FOREIGN PATENT DOCUMENTS

| | | | |
|---|---|---|---|
| JP | 2007141208 | A | 6/2007 |
| JP | 3144158 | U | 8/2008 |
| JP | 2013020433 | A | 1/2013 |
| JP | 2015115540 | A | 6/2015 |
| JP | 2017033100 | A | 2/2017 |
| JP | 2018112938 | A | 7/2018 |
| JP | 2019057099 | A | 4/2019 |
| JP | 2020113108 | A | 7/2020 |
| JP | 2020126517 | A | 8/2020 |
| JP | 2020140444 | A | 9/2020 |
| JP | 2021086351 | A | 6/2021 |

* cited by examiner

| INPUT INFORMATION | ESTIMATED ABNORMALITY STATE | SUPPORT INFORMATION |
|---|---|---|
| · EXCESSIVE VIBRATION<br>· STOP OF CONVEYANCE OBJECT<br>· EXCESSIVE CONVEYANCE LOAD | CONVEYANCE FAILURE | · CONFIRMATION OF MOTOR<br>· CONFIRMATION OF POST-PROCESS OF DEFECT<br>· CONFIRMATION OF POST-PROCESS OF DEFECT |
| · ABNORMAL FLOW RATE OF MATERIAL<br>· ABNORMAL APPEARANCE OF WORK OBJECT<br>· ABNORMAL COLOR OF WORK OBJECT | MATERIAL FAILURE | · MATERIAL SUPPLY<br>· PRECAUTIONS |
| · EXCESSIVE LOAD | EXCESSIVE LOAD OF PROCESSING DEVICE | · REMOVAL OF WORK OBJECT<br>· RESETTING OF PROCESSING DEVICE |
| ·NOISE<br>· TEMPERATURE INCREASE<br>· EXCESSIVE VIBRATION | WEAR OF PARTS | · REPLACEMENT OF PARTS |
| ···· | ···· | ···· |

INPUT INFORMATION { ABNORMALITY BASIC INFORMATION (WORK FIELD SENSOR)<br>ADDITIONAL INFORMATION { ABNORMALITY DETAIL INFORMATION (STATE SENSOR, INPUT BY WORKER)<br>WORKER ATTRIBUTE INFORMATION (WORKER ID)

FIG.3

WORK SUPPORT SYSTEM, AUTONOMOUS MOVABLE BODY FOR WORK SUPPORT, AND WORK SUPPORT METHOD

CROSS REFERENCE TO RELATED APPLICATIONS

This application is a national phase application of International Application No. PCT/JP2022/036424, filed on Sep. 29, 2022, entitled WORK ASSISTANCE SYSTEM, WORK ASSISTANCE AUTONOMOUS VEHICLE, AND WORK ASSISTANCE METHOD, which in turn claims priority to Japanese Patent Application No. 2021-164304, filed on Oct. 5, 2021, the entire disclosures of each of which are incorporated herein by reference for all purposes.

TECHNICAL FIELD

The present disclosure relates to a work support system, an autonomous movable body for work support, and a work support method.

BACKGROUND ART

PTL 1 discloses a system that monitors sensor data in a factory to detect abnormality. A worker who repairs the system goes to an abnormality detected site and performs repair work for eliminating the abnormality.

CITATION LIST

Patent Literature

PTL 1: Japanese Laid-Open Patent Application Publication No. 2015-115540

SUMMARY OF INVENTION

Technical Problem

However, there are various types of abnormalities which may occur in factories. It is a large burden for the worker to previously recognize information necessary for the work of eliminating all the types of abnormalities. Such problem may occur in places other than the factories. Moreover, there may be various types of general work other than the work of eliminating the abnormalities, and the same problem may occur.

An object of one aspect of the present disclosure is to improve the efficiency of work while reducing the burden of a worker.

Solution to Problem

A work support system according to one aspect of the present disclosure includes: a management server including server processing circuitry; and an autonomous movable body including movable body processing circuitry, a movable body communicator electrically connected to the movable body processing circuitry and communicable with the management server, and a machine interface electrically connected to the movable body processing circuitry. The server processing circuitry is configured to: determine a work site that requires work; and transmit site information indicating the work site, to the movable body communicator. The movable body processing circuitry is configured to: receive the site information from the management server through the movable body communicator; generate based on the site information a movement command for making the autonomous movable body autonomously move to the work site; acquire support information for the work at the work site; and output the support information to the worker through the man-machine interface when the autonomous movable body has arrived at the work site.

An autonomous movable body for work support according to one aspect of the present disclosure includes: movable body processing circuitry; a movable body communicator electrically connected to the movable body processing circuitry and communicable with a management server; and a machine interface electrically connected to the movable body processing circuitry. The movable body processing circuitry is configured to: receive site information indicating a work site that requires work, from the management server through the movable body communicator; generate based on the site information a movement command for making the autonomous movable body autonomously move to the work site; acquire support information for the work at the work site; and output the support information to the worker through the man-machine interface when the autonomous movable body has arrived at the work site.

A work support method according to one aspect of the present disclosure includes: determining a work site that requires work; based on site information indicating the work site, generating a movement command for making an autonomous movable body autonomously move to the work site; acquiring support information for the work at the work site; and outputting the support information to a worker through a man-machine interface of the autonomous movable body when the autonomous movable body has arrived at the work site.

Advantageous Effects of Invention

According to one aspect of the present disclosure, even when a worker does not previously recognize information necessary for work at a work site, the worker can obtain support information for the work from an autonomous movable body after the arrival at the work site. Therefore, the efficiency of the work can be improved while reducing the burden of the worker.

BRIEF DESCRIPTION OF DRAWINGS

FIG. 3 is a diagram for explaining a database of FIG. 2.

DESCRIPTION OF EMBODIMENTS

Hereinafter, embodiments will be described with reference to the drawings.

Figure 1:
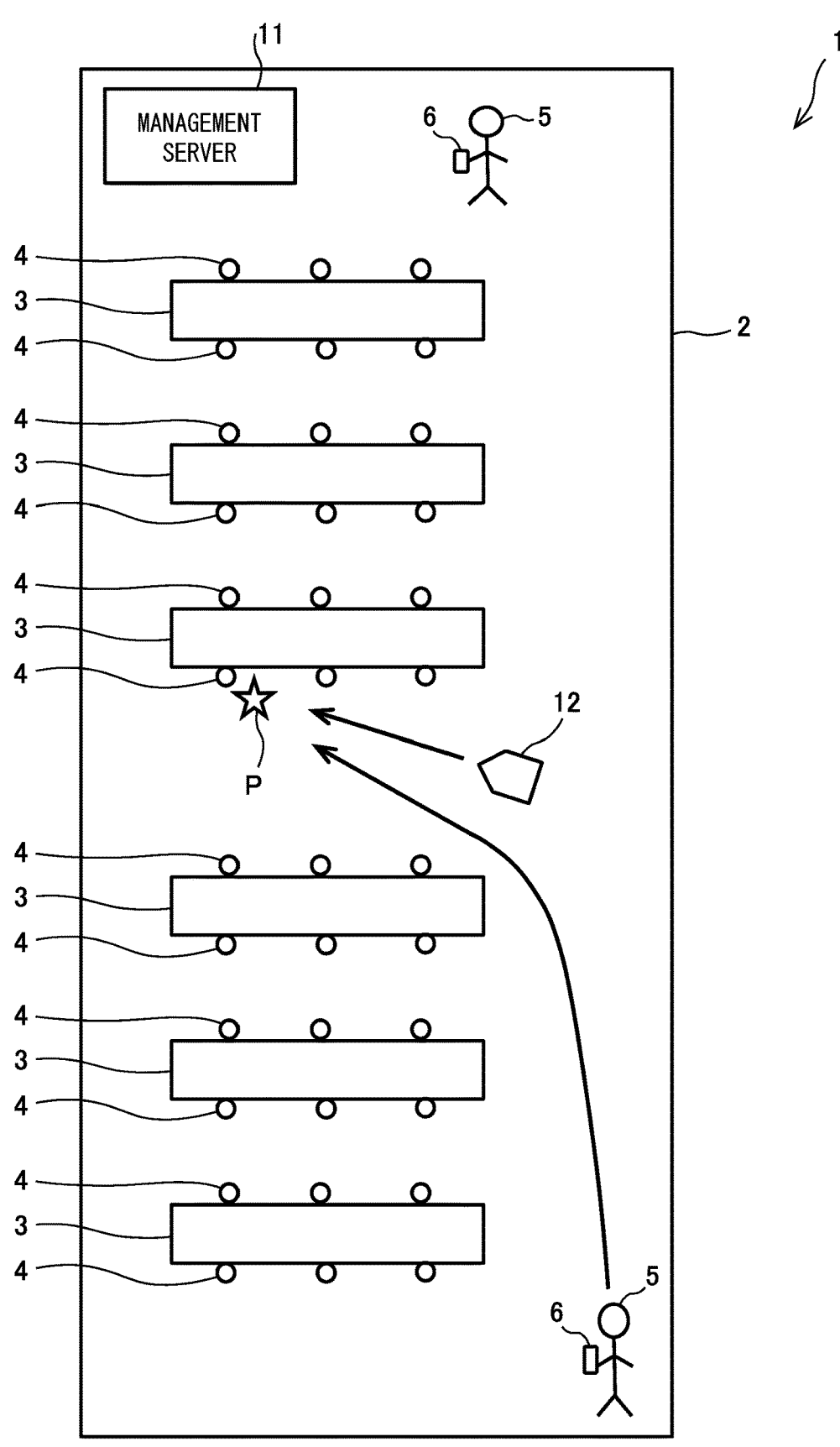
FIG. 1 is a general view of a work support system according to Embodiment 1.

FIG. 1 is a general view of a work support system 1 according to Embodiment 1. The work support system 1 of Embodiment 1 is a system that supports a worker 5 who performs repair work for eliminating an abnormality which occurs in a factory 2 that is a predetermined region. For example, at least a part of the factory 2 is being automated, i.e., factory automation is being realized in at least a part of the factory 2. The factory 2 includes conveyance lines 3 by which work objects are sequentially conveyed. For example, the conveyance lines 3 include a manufacturing line by which final products are manufactured from material objects. The conveyance lines 3 may include: an inspection line in which the material objects or the final products are inspected in a manufacturing process; and a physical distribution line in which work of receiving the material objects or work of shipping the final products are performed.

Part or all of conveyance work of the work objects in each conveyance line 3 may be automated. The manufacturing line includes a conveying apparatus that conveys conveyance target objects that are the work objects to predetermined work spots in order. For example, the conveying apparatus may be realized by a belt conveyor. The work objects are subjected to work (processing, assembling, etc.) set so as to correspond to the respective work spots, by the worker or a working machine. In the factory 2, an abnormality that hinders general work occurs in some cases. For example, a conveyance abnormality may occur, or a processing facility may malfunction. In such a case, the repair worker 5 who is in charge of the elimination of the abnormality performs repair for eliminating the abnormality.

The work support system 1 detects the abnormalities which occur in the factory 2, based on detection results of below-described work field sensors 4. When the work support system 1 detects the abnormality, the work support system 1 informs the repair worker 5 of a work site P where the abnormality has occurred, and the repair work is required. The repair worker 5 who has received the information of the abnormality moves to the work site P informed from the work support system 1 and performs the repair work for eliminating the abnormality.

When the work support system 1 detects the abnormality, the work support system 1 makes a below-described autonomous movable body 12 autonomously move to the work site P. The autonomous movable body 12 supports the repair work performed by the repair worker 5 at the work site P. For example, the autonomous movable body 12 presents information necessary for the repair to the repair worker 5. For example, the autonomous movable body 12 may carry tools and/or replacement parts necessary for the repair into the work site P. For example, the autonomous movable body 12 may carry waste and/or abnormal parts generated at the time of the repair out from the work site P. Since the repair work is lower in frequency than the general work performed at each work spot of the conveyance line 3, the number of repair workers 5 is smaller than the number of work spots. For example, the number of repair workers 5 in the factory 2 is smaller than the number of conveyance lines 3.

The work field sensors 4 are located at or around each conveyance line 3. Each work field sensor 4 is an abnormality detection sensor that can detect the abnormality at a specific site of the conveyance line 3. To be specific, the work field sensor 4 is a sensor that detects or estimates the occurrence of an event that requires the repair work in the factory 2. The work field sensors 4 may be located at the respective work spots of the conveyance line or may be located around spots where the abnormality tends to occur in the conveyance line 3. The work field sensors 4 are electrically connected to a below-described management server 11 so as to be able to transmit communication detection results. For example, each work field sensor 4 transmits information indicating the detection result together with identification information set for the work field sensor 4 to the management server 11 by wireless communication or wired communication.

The type of the work field sensor 4 differs depending on the type of the abnormality that is a detection target. The work field sensor 4 may detect a value having a mechanical, thermal, electrical, magnetic, optical, or chemical property. The work field sensor 4 may be a contact sensor or a non-contact sensor. The work field sensor 4 may be selected from a vibration sensor, a temperature sensor, a pressure sensor, a current sensor, a magnetic sensor, a laser sensor, a camera, a pH (hydrogen ion exponent) sensor, a switch, a microphone, and the like. However, the work field sensor 4 is not limited to this.

The repair worker 5 carries a portable information terminal 6. The portable information terminal 6 may be a terminal, such as a tablet terminal, a smartphone terminal, or a wearable terminal, which can process information. The worker 5 does not have to carry the portable information terminal 6. A stationary information terminal including a large display may be located at a place that the repair worker 5 can see. Each of the portable information terminal and the stationary information terminal is an information display device and is connected to the below-described management server 11 so as to be able to transmit and receive signals to and from the management server 11. The information display device can display the work site P where the abnormality has occurred, based on the information transmitted from the management server 11.

The work support system 1 includes the management server 11 and the autonomous movable body 12. The management server 11 is located in, for example, the factory 2. The management server 11 receives the detection signals of the work field sensors 4 through a communication network as described above. The management server 11 may include servers located dispersedly. The management server 11 may be located outside the factory 2 as long as the management server 11 is communicable with the work field sensors 4 and the autonomous movable body 12.

At least one autonomous movable body 12 is located in the factory 2. The autonomous movable body 12 autonomously moves to a destination without being driven by a human. The autonomous movable body 12 is, for example, an unmanned movable body in which humans do not get. The autonomous movable body 12 is, for example, an UGV (Unmanned Ground Vehicle) or an AGV (Automated Guided Vehicle) but may be an UAV (Unmanned Aerial Vehicle) or the like. A movable range of the autonomous movable body 12 includes the lines 3. The autonomous movable body 12 is movable among potential work sites where the abnormalities may occur in the factory 2. In the present embodiment, the number of autonomous movable bodies 12 is smaller than the number of repair workers 5. However, the present embodiment is not limited to this.

Figure 2:
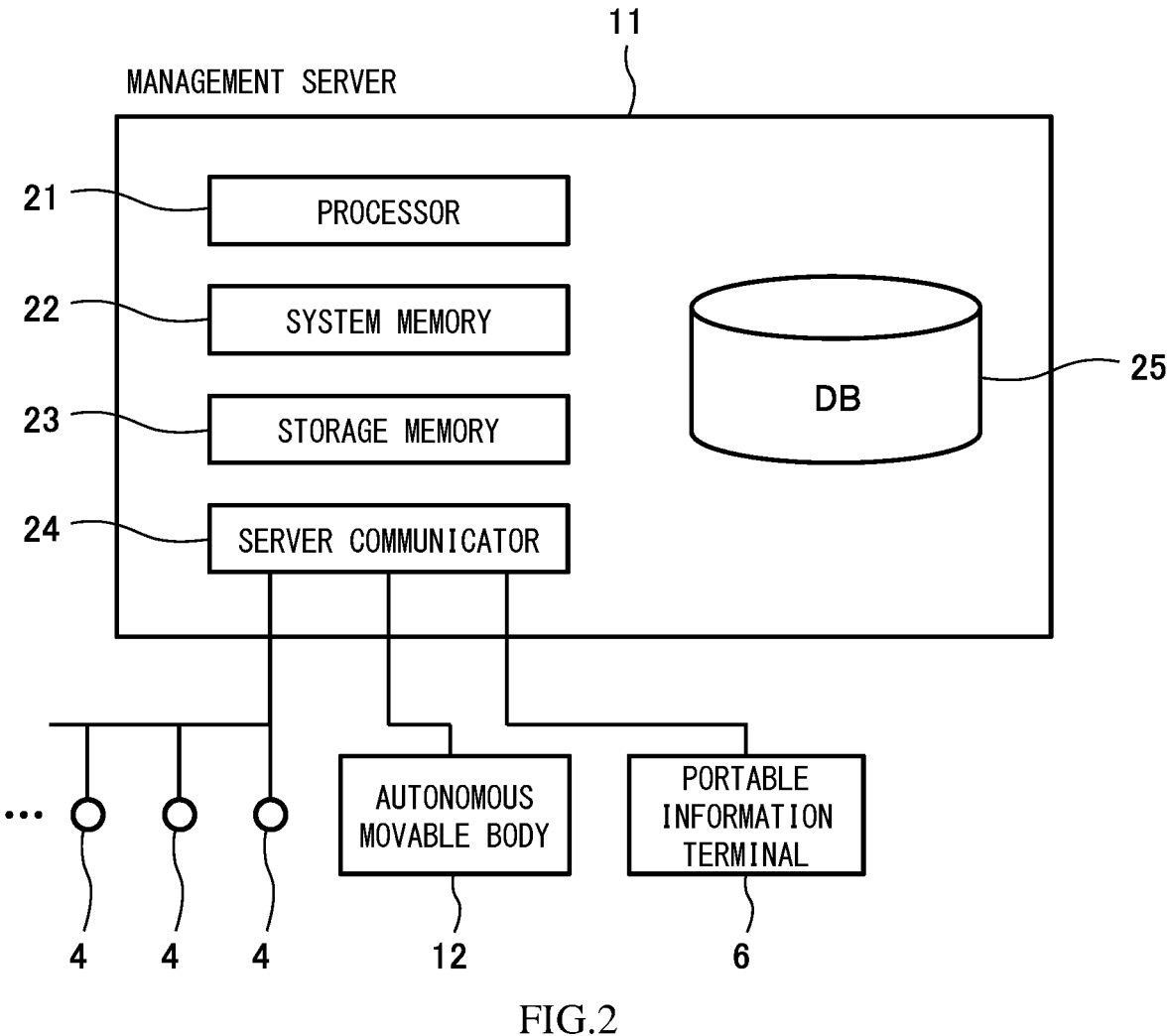
FIG. 2 is a block diagram of a management server of FIG. 1.

FIG. 2 is a block diagram of the management server 11 of FIG. 1. As shown in FIG. 2, the management server 11 includes a processor 21, a system memory 22, a storage memory 23, a communicator 24, and a database 25. The processor 21 may include a CPU (central processing unit). The system memory 22 may include a RAM (Random Access Memory). The storage memory 23 may include a ROM (Read Only Memory). The storage memory 23 may include a hard disk, a flash memory, or a combination thereof.

The storage memory 23 stores a sever support program. A configuration in which the processor 21 executes the sever support program read out from the storage memory 23 to the system memory 22 is one example of server processing circuitry. The sever support program may be stored in a computer-readable medium. The computer-readable medium is a non-transitory and tangible medium. The storage memory 23 stores identification information set for each work field sensor 4 and positional information indicating an installation location of the work field sensor 4 corresponding to the identification information in association with each other. Therefore, the processor 21 of the management server 11 can determine based on the identification information of the work field sensor 4 the place where the abnormality has occurred, i.e., the work site P that requires repair.

The server communicator 24 is communicable with the work field sensor 4 by wired communication, wireless communication, or a combination thereof. The server communicator 24 is communicable with the autonomous movable body 12 through a wireless communication network. The database 25 stores information for supporting the work performed by the repair worker 5 to eliminate the abnormality detected by the work field sensor 4 (see FIG. 1).

FIG. 3 is a diagram for explaining the database 25 of FIG. 2. As shown in FIG. 3, the database 25 stores a correspondence relation between input information for estimating the abnormality state and support information for supporting the repair work of eliminating the abnormality. The input information is information for outputting the support information. The input information includes, for example, abnormality basic information and additional information. The abnormality basic information is information obtained from the detection signal of the work field sensor 4. As one example, the abnormality basic information is information indicating that vibration is excessively large. The additional information is information obtained from a detection signal of a state sensor 61 (see FIG. 4) of the autonomous movable body 12. Moreover, the input information may include worker attribute information indicating the attribute of a person who performs the repair work.

The database 25 stores a correspondence relation among the input information for estimating the abnormality state, the abnormality state estimated based on the input information, and the support information for eliminating the abnormality state, which are associated with each other. In addition to the detected value (basic abnormality information) from the work field sensor 4, the input information may include the detected value from the state sensor 61 located at the autonomous movable body 12 and the additional information, such as worker input information input by the repair worker 5. By referring to the database 25 based on the input information, the corresponding abnormality state can be estimated. The database 25 prestores the support information for eliminating the estimated abnormality state. It is preferable that the information (such as the input information, the abnormality state, and the support information) accumulated in the database 25 be updated regularly or irregularly. The correspondence relation may be prestored or may be updated by machine learning.

For example, as the input information, the management server 11 is supplied with information indicating that a vibration value and/or a conveyance load detected by the work field sensor 4 located in the vicinity of the conveyance line 3 has exceeded a normal range. The input information may include information supplied to the management server 11 from the repair worker 5 and/or the state sensor 61 of the autonomous movable body 12 in addition to the work field sensor 4. For example, as the input information, the management server 11 is supplied with information indicating a conveyance object stop state detected by photographing of the state sensor 61 located at the autonomous movable body 12. In this case, the input information and the abnormality state are associated with each other in the database 25 such that the abnormality state is estimated as a conveyance failure. To deal with a case where the abnormality state is estimated as the conveyance failure, the database 25 stores, as the support information, information of the repair work for eliminating the conveyance failure.

The support information may include, for example, information indicating a maintenance procedure of a conveyance motor which eliminates the conveyance failure (clogging, for example), a disassembling procedure of the conveying apparatus, a confirmation instruction of a pre-process of a defective portion, a confirmation instruction of a post-process of the defective portion, a contact number of a conveying apparatus supplier, and the like. The support information may be provided by text, an image, and/or a video.

It is preferable that the database 25 store plural types of abnormality states. In this case, the processor 21 of the management server 11 refers to the database 25 and selects the corresponding abnormality state from the plural types of abnormality states based on the supplied input information. It is preferable that the database 25 store plural types of support information corresponding to one abnormality state. In this case, the processor 21 of the management server 11 may refer to the database 25 and output methods of eliminating the estimated abnormality state. Thus, an effect of supporting the repair work is improved. The sever support program stored in the storage memory 23 of the management server 11 may output the support information in accordance with a flowchart that changes the support information in accordance with YES or NO answered by the repair worker 5. The database 25 may store information of manuals of various facilities. As the support information, the database 25 may store past repair histories and repair details.

As described above, the additional information includes information obtained from the detection signal of the state sensor 61 (see FIG. 4) of the autonomous movable body 12. The additional information may include information which has been input through the autonomous movable body 12 (see FIG. 4) by the repair worker 5 who has directly confirmed an abnormal portion. Examples of the additional information may include: information directly indicating the abnormality state in which the conveyance failure has occurred; information indicating that a bolt has fallen off; and information indicating a factor of the abnormality state in which vibrationproof rubber has deteriorated.

The input information includes information obtained from worker identification information read out by an ID reader 63 (see FIG. 4) of the autonomous movable body 12. For example, the worker attribute information includes a skill level of the worker, a height of the worker, and the like. Instead of the database 25 which stores the correspondence relation, a configuration, such as artificial intelligence, which outputs the support information with respect to the input information by machine learning may be adopted.

Figure 4:
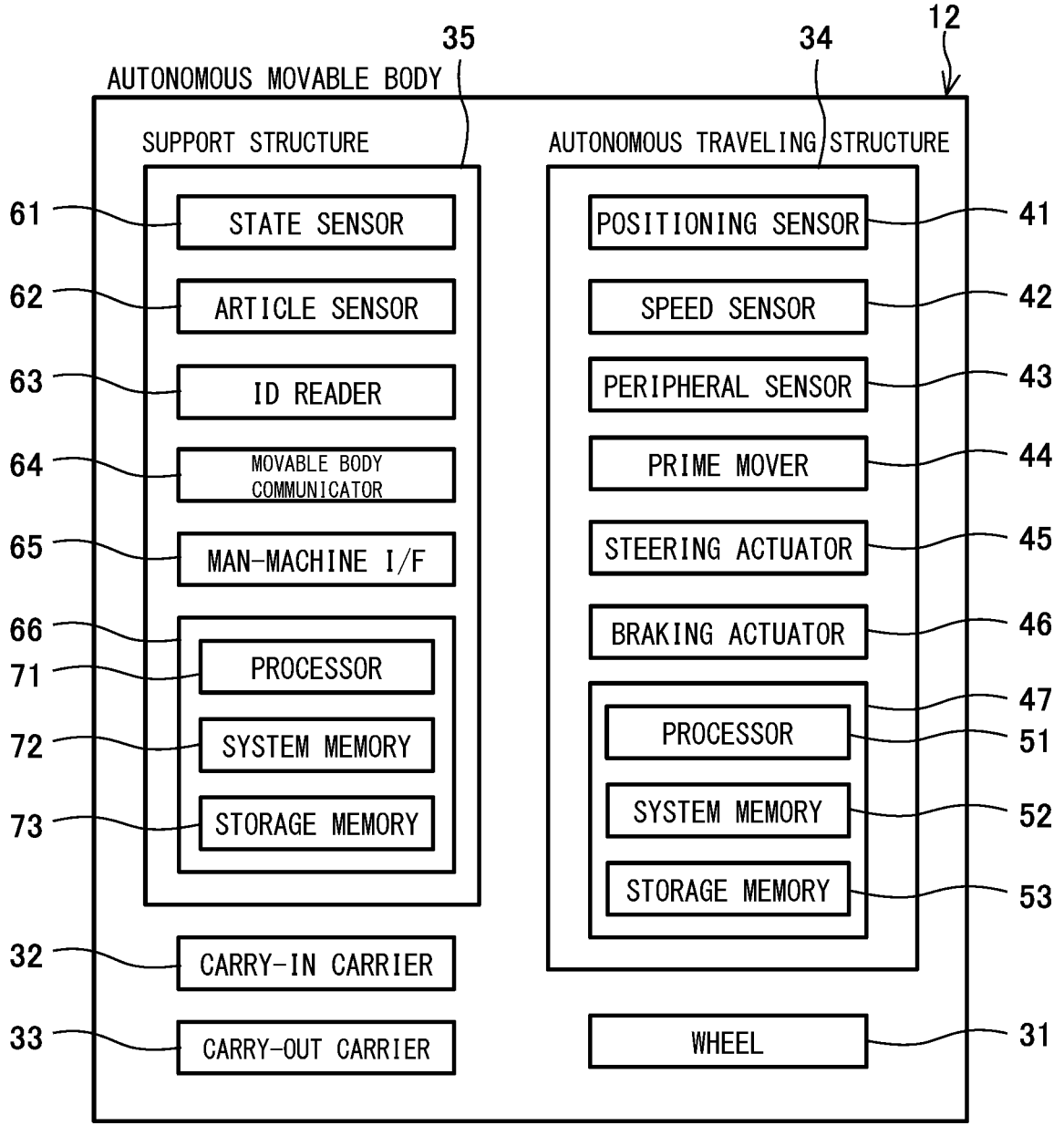
FIG. 4 is a block diagram of an autonomous movable body of FIG. 1.

FIG. 4 is a block diagram of the autonomous movable body 12 of FIG. 1. As shown in FIG. 4, the autonomous movable body 12 includes a wheel 31, a carry-in carrier 32, a carry-out carrier 33, an autonomous traveling structure 34, and a support structure 35. The wheel 31 is a propulsive force generator that moves a body of the autonomous movable body 12. The propulsive force generator may be a propeller or the like instead of the wheel 31. The carry-in carrier 32 is located at the body of the autonomous movable body 12 and carries work articles to be used for the repair work. Examples of the work articles include tools, parts, and materials. The carry-out carrier 33 is located at the body of the autonomous movable body 12 and carries after-work articles generated by the repair work. Examples of the after-work articles include waste and defective parts.

The autonomous traveling structure 34 includes a positioning sensor 41, a speed sensor 42, a peripheral sensor 43, a prime mover 44, a steering actuator 45, a braking actuator 46, and a controller 47. These elements 41 to 47 of the autonomous traveling structure 34 are electrically connected to each other. The positioning sensor 41 detects position coordinates of the autonomous movable body 12. The positioning sensor 41 may be a satellite positioning sensor or a sensor that acquires the position coordinates by wireless communication with locators located on land by radio waves, sound waves, light, or magnetism. Examples of a positioning principle using the locators include an AOA (Angle Of Arrival) method, a RSSI (Received Signal Strength Indicator) method, a TOA (Time of Arrival) method, and a TDOA (Time Difference Of Arrival) method.

The speed sensor 42 detects a movement speed of the autonomous movable body 12. The peripheral sensor 43 detects, for example, an obstacle around the autonomous movable body 12. Examples of the peripheral sensor 43 may include an infrared sensor, a camera, and a laser sensor. The prime mover 44 generates driving force that drives the wheel 31. The prime mover 44 is, for example, an electric motor, an internal combustion engine, or a combination thereof. The steering actuator 45 steers the wheel 31. The braking actuator 46 drives a brake that brakes the wheel 31. The steering actuator 45 and the braking actuator 46 may be electric motors.

The controller 47 includes a processor 51, a system memory 52, and a storage memory 53. The processor 51 may include a CPU (central processing unit). The system memory 52 may include a RAM. The storage memory 53 may include a hard disk, a flash memory, or a combination thereof. The storage memory 53 stores a map of an inside of the factory 2 and an autonomous traveling program. A configuration in which the processor 51 executes the autonomous traveling program read out from the storage memory 53 to the system memory 52 is one example of movable body processing circuitry.

Until the processor 51 that executes the autonomous traveling program receives from the management server 11 a movement command for moving the autonomous movable body 12 to an abnormality occurrence site, the processor 51 generates a patrol command for making the autonomous movable body 12 patrol the inside of the factory 2. To be specific, the processor 51 refers to the map stored in the storage memory 53 and controls the prime mover 44, the steering actuator 45, and the braking actuator 46 based on the detection signals of the positioning sensor 41, the speed sensor 42, the peripheral sensor 43, and the like to make the autonomous movable body 12 patrol the inside of the factory 2.

When the processor 51 that executes the autonomous traveling program receives the movement command specifying the destination, the processor 51 refers to the map stored in the storage memory 53 and determines a route to the destination. The processor 51 that executes the autonomous traveling program controls the prime mover 44, the steering actuator 45, and the braking actuator 46 based on the detection signals of the positioning sensor 41, the speed sensor 42, the peripheral sensor 43, and the like such that the autonomous movable body 12 travels along the determined route. The autonomous movable body 12 may communicate with the management server 11 to refer to the map stored in the management server 11. Part or all of the autonomous traveling program may be executed by the management server 11. The management server 11 may determine the route to the destination. The management server 11 may remotely control the prime mover 44, the steering actuator 45, and the braking actuator 46.

The support structure 35 includes the state sensor 61, an article sensor 62, the ID reader 63, a movable body communicator 64, a man-machine interface 65, and a controller 66. The elements 61 to 66 of the support structure 35 are electrically connected to each other. The state sensor 61 detects state information indicating the state of the abnormality at a specific work site. The state sensor 61 may be selected from, for example, a camera, a temperature sensor, a pressure sensor, a magnetic sensor, a laser sensor, a microphone, and the like. However, the state sensor 61 is not limited to these. When the autonomous movable body 12 arrives at an occurrence site of the abnormality detected by the work field sensor 4 (see FIG. 1), the camera of the state sensor 61 takes an image or video of the portion of the abnormality. The state sensor 61 may be a sound collection sensor and may detect noise generated at the abnormality occurrence site. The state sensor 61 may be a gas sensor and may detect a nasty smell generated at the abnormality occurrence site.

It is preferable that the state sensor 61 be a sensor that is more suitable for detailed analysis of the abnormality state than the work field sensor 4. For example, the work field sensor 4 is of a type located in the factory 2, whereas the state sensor 61 may be movably located so as to be able to approach the abnormal portion. The state sensor 61 may be higher in detection accuracy than the work field sensor 4. When the state sensor 61 is higher in detection accuracy than the work field sensor 4, a detection range of the state sensor 61 may be set to be narrower than that of the work field sensor 4.

The article sensor 62 detects specific information (identification information, for example) of the work article existing in the carry-in carrier 32. The article sensor 62 detects specific information (identification information, for example) of the after-work article existing in the carry-out carrier 33. When IC tags are located at the work articles and the after-work articles, the article sensor 62 may be an IC tag reader. When the IC tags are not located at the work articles and the after-work articles, the article sensor 62 may be a camera and may recognize the articles from the shapes of the articles which are acquired by image recognition technology.

The ID reader 63 reads out the identification information of the worker 5 from an ID device possessed by the repair worker 5. For example, when the repair worker 5 possesses an IC tag, the ID reader 63 may be an IC tag reader. The movable body communicator 64 communicates with the server communicator 24 through a wireless communication network. The man-machine interface 65 can output information to the worker 5 and receive information from the worker 5. Examples of the man-machine interface 65 include a touch panel display and a sound input-output device. When the man-machine interface 65 is a display, the display includes a larger screen than a display of the portable information terminal 6.

The controller 66 includes a processor 71, a system memory 72, and a storage memory 73. The processor 71 may include a CPU (central processing unit). The system memory 72 may include a RAM. The storage memory 73 may include a hard disk, a flash memory, or a combination thereof. The storage memory 73 stores a movable body support program. A configuration in which the processor 71 executes the movable body support program read out from the storage memory 73 to the system memory 72 is one example of movable body processing circuitry. The movable body support program may be stored in a computer-readable medium. The computer-readable medium is a non-transitory and tangible medium.

Figure 5:
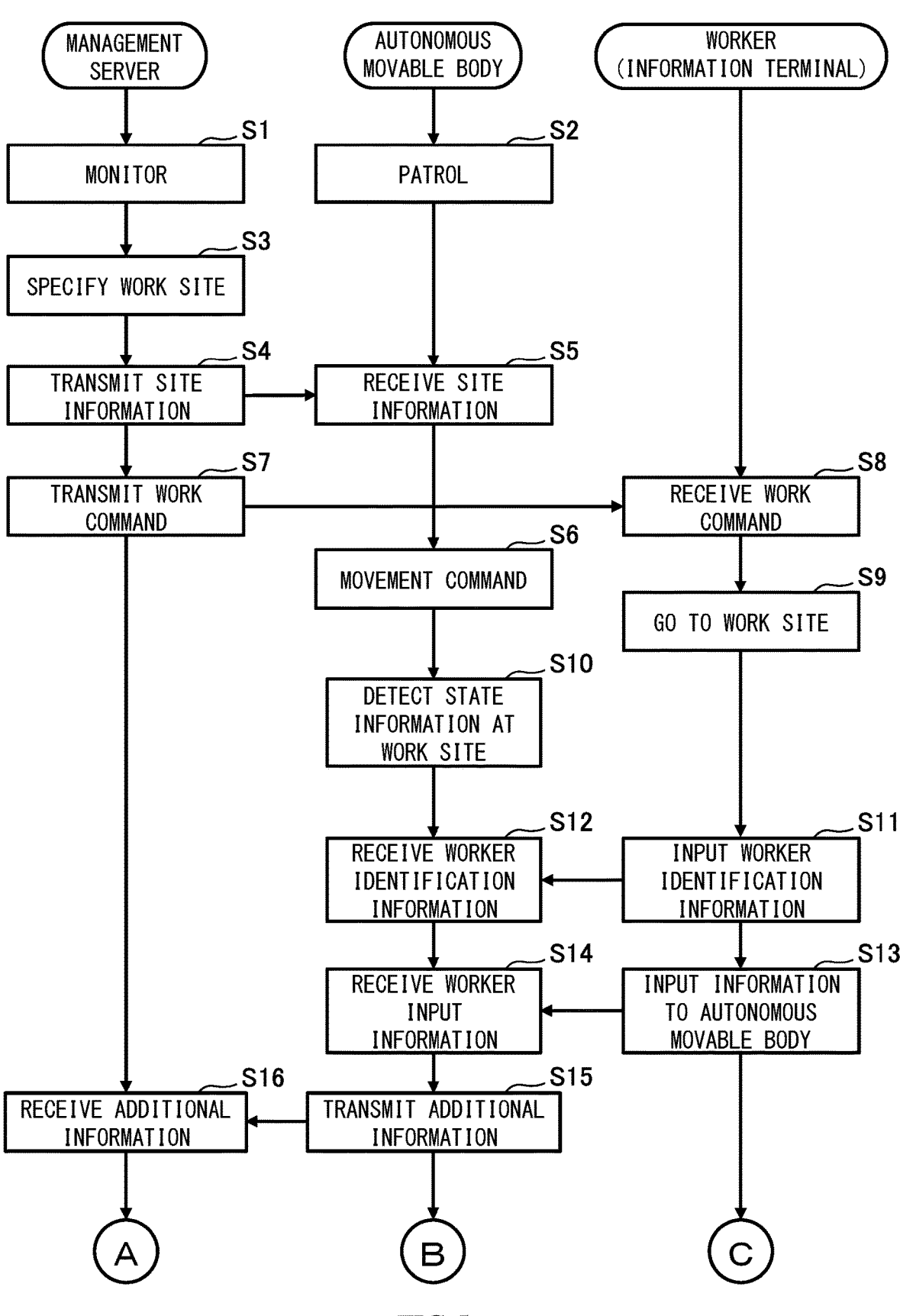
FIG. 5 is a flowchart for explaining processing of the work support system of FIG. 1.
Figure 6:
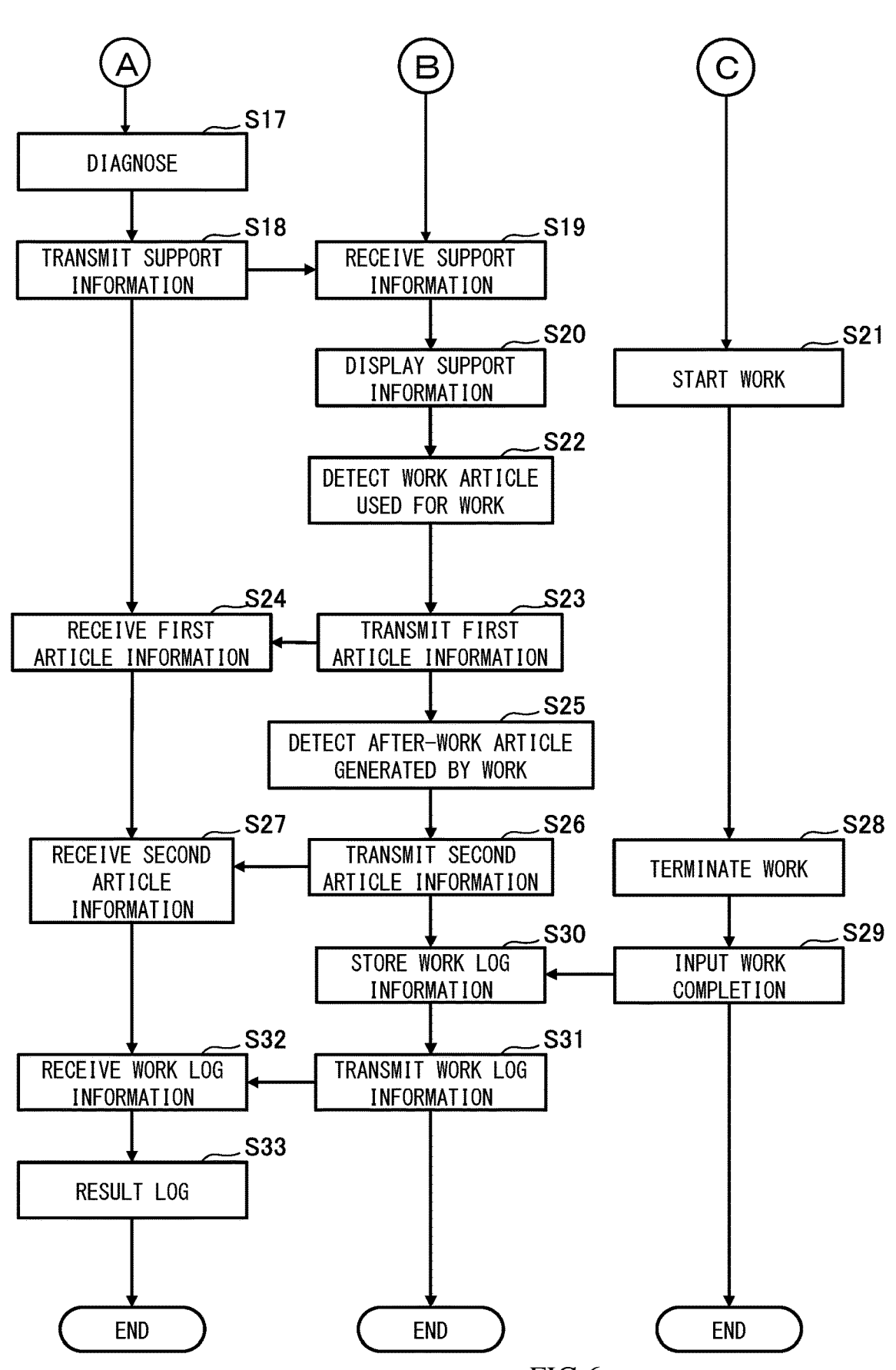
FIG. 6 is a flowchart for explaining the processing of the work support system of FIG. 1.

Each of FIGS. 5 and 6 is a flowchart for explaining processing of the work support system 1 of FIG. 1. Below-described processing is performed in such a manner that the sever support program is executed by the processor 21 of the management server 11, and the movable body support program is executed by the processor 71 of the autonomous movable body 12. The following will be described based on the flow of FIGS. 5 and 6 with suitable reference to FIGS. 1 to 4.

As shown in FIG. 5, to grasp the entire factory 2, the management server 11 monitors whether or not the abnormality has occurred in any one of the detection signals of the work field sensors 4 (Step S1). Until the generation of the movement command specifying the destination, the autonomous movable body 12 patrols the inside of the factory 2 (Step S2).

The management server 11 determines the work site that requires the repair work performed by the repair worker 5. Specifically, the management server 11 prestores arrangement sites of the work field sensors 4. When the management server 11 detects the abnormality in any one of the detection signals of the work field sensors 4, the management server 11 specifies the work field sensor 4, which is a transmission source, from transmission source information included in the detection signal indicating the abnormality. Thus, the management server 11 specifies as the abnormality occurrence site the arrangement site of the work field sensor 4 which has transmitted the detection signal indicating the abnormality. The management server 11 specifies the abnormality occurrence site as the work site P (see FIG. 1) that requires the repair work performed by the worker 5 (Step S3).

The management server 11 transmits site information indicating the work site P to the movable body communicator 64 of the autonomous movable body 12 (Step S4). The support structure 35 of the autonomous movable body 12 receives the site information (Step S5) and generates based on the site information the movement command for making the autonomous movable body 12 autonomously move to the work site P (Step S6). The autonomous traveling structure 34 of the autonomous movable body 12 makes the autonomous movable body 12 travel to the work site P in accordance with this movement command.

The management server 11 transmits a work command to the portable information terminal 6 possessed by the specific repair worker 5 who is closest to the work site P among the repair workers 5 (Step S7), the work command being a command for urging the repair worker 5 to move to the work site P. The order of Steps S4 and S7 is determined arbitrarily, and Steps S4 and S7 may be performed substantially at the same time. The portable information terminal 6 possessed by the repair worker 5 receives the site information (Step S8), and the worker 5 who has seen the site information displayed on the portable information terminal 6 moves to the work site P for the repair work (Step S9).

The management server 11 urges the repair worker 5 who is close to the work site P, to move to the work side P, or the management server 11 may select the worker 5 to be urged to move to the work site P, from the repair workers 5 in accordance with the type of the abnormality state. For example, the management server 11 may determine whether the type of the abnormality is a mechanical failure or an electrical failure, and may transmit information for urging the movement for the repair, to the portable information terminal 6 of the repair worker 5 in charge. The management server 11 may transmit the information for urging the movement for the repair, to the portable information terminals 6 of the repair workers 5. When the management server 11 determines that one repair worker 5 has arrived at the work site P, the management server 11 may transmit information for stopping the movements of the other repair workers 5, to the portable information terminals 6 of those repair workers 5.

When the autonomous movable body 12 has arrived at the work site P, the autonomous movable body 12 detects the state information indicating the state of the abnormal portion by the state sensor 61 (Step S10). For example, the autonomous movable body 12 stores as the abnormality detail information in the storage memory 73 an image or video of a monitoring target portion of the work field sensor 4 which has detected the abnormality, the image or video being taken by the camera of the state sensor 61. Then, the autonomous movable body 12 transmits this abnormality detail information as the additional information to the management server 11. The monitoring target portions of the respective work field sensors 4 are prestored in the management server 11 or the autonomous movable body 12. The processor 21 of the management server 11 recognizes a difference from a normal state based on the received image or video by utilizing image processing technology. The information obtained from the work field sensor 4 is the abnormality basic information, and the information obtained from the state sensor 61 is one of the pieces of abnormality detail information. As one example, the abnormality detail information may include information indicating that a bolt has fallen off.

When the worker 5 has arrived at the work site P, the worker 5 inputs the worker identification information to the autonomous movable body 12 by making the ID reader 63 read the IC tag possessed by the worker 5 (Step S11). The autonomous movable body 12 receives the input worker identification information and stores the received worker identification information in the storage memory 73 (Step S12).

The worker 5 visually confirms the abnormal portion at the work site P and inputs information regarding the abnormality recognized by the visual confirmation, as the worker input information to the man-machine interface 65 of the autonomous movable body 12 (Step S13). The worker input information is one of the pieces of abnormality detail information. Examples of the worker input information include information indicating that vibrationproof rubber has deteriorated and information indicating that noise is being generated. The autonomous movable body 12 receives the input worker input information and stores the received worker identification information in the storage memory 73 (Step S14).

The autonomous movable body 12 transmits the information stored in the storage memory 73 in Steps S10, S12, and S14, as the additional information to the management server 11 (Step S15), and the management server 11 receives the additional information (Step S16). The additional information is information transmitted from the autonomous movable body 12 to the management server 11 and is different from information transmitted from devices other than the autonomous movable body 12 to the management server 11. The additional information includes the state information detected by the state sensor 61, the worker identification information read by the ID reader 63, and the worker input information input from the man-machine interface 65.

When the state information is detected by the state sensor 61, the autonomous movable body 12 may transmit the state information as the additional information to the management server 11 without waiting for the acquisition of the worker identification information and the worker input information. The additional information does not have to include at least one of the worker identification information and the worker input information.

As shown in FIG. 6, the management server 11 diagnoses the abnormality based on the received additional information (Step S17). Specifically, in the management server 11, the processor 21 that executes the sever support program refers to the database 25 (see FIG. 3) and determines based on the input information the support information for supporting the repair work. The processor 21 determines the support information based on the abnormality basic information obtained from the work field sensor 4 and the additional information obtained from the autonomous movable body 12.

As one example, the processor 21 determines the procedure of the repair work as the support information based on the abnormality basic information indicating that vibration is excessively large, the abnormality detail information including the information indicating that a bolt has fallen off and the information indicating that vibrationproof rubber has deteriorated, and the worker identification information. As one example, the support information may include an instruction for stopping the operation of the abnormal portion, designation of a tool to be used, an instruction for replacing the bolt and the vibrationproof rubber, and an instruction for restarting the abnormal portion. When it is determined that the abnormal portion is at a high place, and it is also determined based on the worker identification information that the worker 5 is short in height, the support information may include designation of the use of a stool.

The server communicator 24 of the management server 11 transmits the determined support information to the movable body communicator 64 of the autonomous movable body 12 (Step S18). The autonomous movable body 12 receives the support information (Step S19) and makes the man-machine interface 65 output the support information (Step S20). The man-machine interface 65 may display the support information on a screen or may output the support information as sound. The worker 5 starts the repair work in accordance with the support information displayed on the man-machine interface 65 (Step S21).

The worker 5 performs the work by using the work articles mounted on the carry-in carrier 32 of the autonomous movable body 12. For example, as the work articles, the worker 5 uses tools, bolts, vibrationproof rubber, and the like, which are mounted on the carry-in carrier 32. The article sensor 62 can detect the work articles which have been taken out from the carry-in carrier 32, and therefore, can recognize the work articles which have been used for the work (Step S22). The autonomous movable body 12 transmits to the management server 11, first article information indicating the work article which has been taken out from the carry-in carrier 32 and used for the work (Step S23). The management server 11 receives the first article information from the autonomous movable body 12 to acquire the information indicating the work article which has been used for the work (Step S24).

When the after-work articles generated by the repair work performed by the worker 5 are put into the carry-out carrier 33, the after-work articles are detected by the article sensor 62. For example, when the defective part which has been replaced by the repair work is put into the carry-out carrier 33, the article sensor 62 can detect information of the replaced part to recognize the after-work article generated by the repair work (Step S25). The autonomous movable body 12 transmits to the management server 11, second article information indicating the after-work article which has been put into the carry-out carrier 33 (Step S26). The management server 11 receives the second article information from the autonomous movable body 12 to acquire the information of the after-work article (Step S27).

When the repair work is terminated (Step S28), the worker 5 performs an input of work completion to the man-machine interface 65 of the autonomous movable body 12 (Step S29). Upon reception of the input of the work completion, the autonomous movable body 12 stores as work log information in the storage memory 73, completion of the repair work instructed by the support information (Step S30). The autonomous movable body 12 transmits the work log information to the management server 11 through the movable body communicator 64 (Step S31).

The management server 11 receives the work log information from the autonomous movable body 12 (Step S32). The management server 11 stores the first article information, the second article information, and the work log information as a result log in the storage memory 23 or the database 25 (Step S33). Then, the processing of the management server 11 returns to Step S1, and the processing of the autonomous movable body 12 returns to Step S2. The autonomous movable body 12 delivers the after-work article in the carry-out carrier 33 to a predetermined place at an appropriate timing during the patrol. The autonomous movable body 12 is movable among the sites in the factory 2 and may continuously support the work at a first site and the work at a second site.

According to the above-described configuration, even when the worker 5 does not previously recognize the information necessary for the work at the work site P, the worker 5 can obtain the support information for the work from the man-machine interface 65 of the autonomous movable body 12 after the arrival at the work site P. Thus, the repair worker 5 can save labor of going to the work site P with a work manual and performing the work while referring to the work manual. Therefore, the efficiency of the work can be improved while reducing the burden of the worker 5. According to the above disclosure, the support information is transmitted after the reception of the additional information. However, the support information may be transmitted at the same timing as the transmission of the work command.

Since the management server 11 determines the support information based on the additional information transmitted from the autonomous movable body 12, the usefulness of the support information with respect to the required work can be improved. Moreover, since the detail information of the work site P is acquired by the autonomous movable body 12, an advanced sensor does not have to be used as the work field sensor 4. Therefore, the cost of a large number of work field sensors 4 located in the factory 2 can be reduced. In some cases, the number of work field sensors 4 can be reduced, and the detection range of the work field sensor 4 can be made small.

Since the management server 11 determines the support information based on the state information detected at the work site P by the autonomous movable body 12, the usefulness of the support information with respect to the required work can be improved.

Since the management server 11 determines the support information based on the worker input information which has been input to the autonomous movable body 12 by the worker who has confirmed the state of the work site P, the usefulness of the support information with respect to the required work can be improved.

Since the additional information includes the worker identification information, the support information corresponding to the worker can be provided. For example, the support information corresponding to the degree of skill of the repair worker 5 may be displayed.

Since the autonomous movable body 12 includes the carry-in carrier 32 on which the work articles to be used for the work are mounted, it is possible to avoid wasteful work in which the worker who has arrived at the work site P notices the lack of articles (tools, materials, and the like) to be used for the work and goes to a different place to take them. In addition, it is also possible to eliminate the necessity for the worker 5 to go to the work site P with a larger number of articles than necessary.

Since the information of the work article which has been used for the work is transmitted to the management server 11, the information of the article which has been used for the work can be easily managed.

Since the autonomous movable body 11 includes the carry-out carrier on which the after-work articles generated by the work are mounted, and the autonomous movable body 12 delivers the after-work article generated by the work to a predetermined place, the labor of the worker 5 can be saved.

Since the information of the after-work article is transmitted to the management server 11, the article generated by the work can be easily managed.

Since the work log information indicating the work which has been performed by the worker 5 is stored in the storage memory 73 of the autonomous movable body 12 and is transmitted from the movable body communicator 64 to the management server 11, the work result can be easily managed in the management server 11 and can be utilized for future work improvement.

Since the work command for urging the worker 5 to move to the work site P is transmitted to the portable information terminal 6, the worker 5 can go to the work site P at an appropriate timing.

The autonomous movable body 12 patrols the side of the factory 2 until the generation of the movement command for the work. Therefore, even when there is no work, the autonomous movable body 12 can be made to monitor the inside of the factory 2, and the access to the autonomous movable body 12 by the worker 5 can be facilitated.

Conveyed products conveyed by the conveyance line 3 are not especially limited and may be processed food, electronic parts, integrated circuits, medicine, and the like in addition to assembly products. The factory 2 is a factory of line manufacturing in which parts are processed at each work spot but may be a factory of another manufacturing method. For example, the factory 2 may be a manufacturing factory which manufactures chemical materials, metal materials, printed products, or the like and in which processing is continuously performed, or may be an automated warehouse to and from which physical distribution articles are put in and taken out. The above-disclosed technology may be applied to not the entire factory but a region that is part of the factory. In the present disclosure, the autonomous movable body 12 executes the program for patrolling the inside of the factory 2 until the reception of the movement command for the movement to the work site P. However, the autonomous movable body 12 may stop at a predetermined position. In addition to a failure state in which the line 3 stops, a future repair state in which there is a possibility that the failure occurs in the future may be determined as the abnormality state. Thus, the repair can be performed without stopping the line 3.

Embodiment 2

Figure 7:
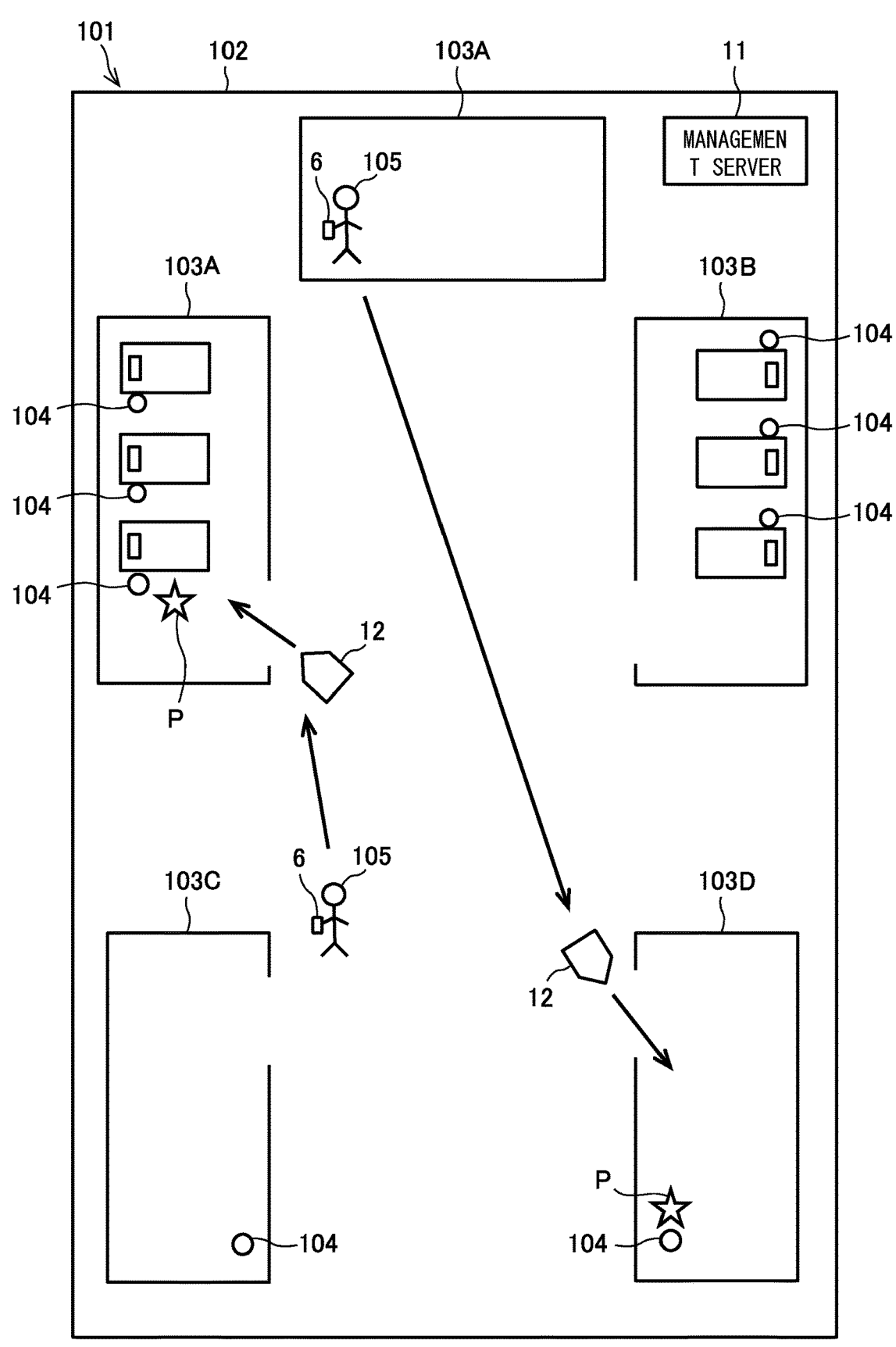
FIG. 7 is a general view of the work support system according to Embodiment 2.

FIG. 7 is a general view of a work support system 101 according to Embodiment 2. As shown in FIG. 7, the work support system 101 is a system that supports medical work generated in a hospital 102. The hospital 102 includes work generated areas. Examples of the work generated areas include a nurses' station 103A, a sickroom 103B, a consultation room 103C, and an operating room 103D. Work field sensors 104 that detect the occurrence of an event that requires the work are located in the work generated areas. Each work field sensor 104 may be selected from an indoor camera, a nurse call switch, a doctor call switch, a sensor of a surgical robot, and the like.

The work support system 101 includes the management server 11 and the autonomous movable body 12. Since the basic functions of the management server 11 and the basic functions of the autonomous movable body 12 are the same as those in Embodiment 1, the following will be described by using the same reference signs as Embodiment 1. The management server 11 is located in the hospital 102 but may be located outside the hospital 102. The autonomous movable body 12 is movable among potential work sites in the hospital 102. In the present embodiment, the number of autonomous movable bodies 12 is smaller than the number of workers 105. However, the present embodiment is not limited to this. The workers 105 include nurses, doctors, and the like.

Since the processing of the work support system 101 of Embodiment 2 is similar to the processing of the work support system 1 of Embodiment 1, the processing of the work support system 101 will be described based on the flow of FIGS. 5 and 6 with suitable reference to FIGS. 2 to 4, 7, and the like. As shown in FIG. 5, to grasp the entire hospital 102, the management server 11 monitors the detection states of the work field sensors 104 (Step S1). The autonomous movable body 12 patrols the inside of the hospital 102 until the generation of the movement command that designates the destination (Step S2).

When the management server 11 receives the detection signal indicating the generation of the medical work from the work field sensor 104, the management server 11 refers to the transmission source information of the detection signal and specifies a medical work generated site. The management server 11 specifies the medical work generated site as the work site P (see FIG. 7) that requires the medical work performed by the worker 105 (Step S3).

The management server 11 transmits the site information indicating the work site P to the movable body communicator 64 of the autonomous movable body 12 (Step S4). The support structure 35 of the autonomous movable body 12 receives the site information (Step S5) and generates based on the site information the movement command for making the autonomous movable body 12 autonomously move to the work site P (Step S6). The autonomous traveling structure 34 of the autonomous movable body 12 makes the autonomous movable body 12 travel to the work site P in accordance with this movement command.

The management server 11 transmits to the portable information terminal 6 possessed by the worker 105 who is in charge of the work site P, the work command for urging the worker 105 to move to the work site P (Step S7). The portable information terminal 6 possessed by the worker 5 receives the site information (Step S8), and the worker 5 who has seen the site information displayed on the portable information terminal 6 goes to the work site P for the medical work (Step S9).

When the autonomous movable body 12 has arrived at the work site P, the autonomous movable body 12 detects the state information indicating the state of the work site P by the state sensor 61 (Step S10). For example, the autonomous movable body 12 stores as state detail information in the storage memory 73 an image or video of the work site P which is taken by the camera of the state sensor 61. Then, the autonomous movable body 12 transmits this state detail information as the additional information to the management server 11. The processor 21 of the management server 11 may recognize a difference from the normal state based on the received image or video by utilizing image processing technology. The information obtained from the work field sensor 4 is state basic information, and the information obtained from the state sensor 61 is one of the pieces of state detail information. As one example, the state detail information may include information indicating that there is no drip infusion fluid. The state sensor 61 may include a drip infusion fluid remaining amount sensor, a pulse sensor, a blood oxygen sensor, a temperature sensor, an echo, an electrocardiogram, a breath sensor, or the like.

When the worker 105 has arrived at the work site P, the worker 105 inputs the worker identification information to the autonomous movable body 12 by making the ID reader 63 read the IC tag possessed by the worker 105 (Step S11). The autonomous movable body 12 receives the input worker identification information and stores the received worker identification information in the storage memory 73 (Step S12).

The worker 105 visually confirms the state of the work site P and inputs information indicating the state recognized by the visual confirmation, as the worker input information to the man-machine interface 65 of the autonomous movable body 12 (Step S13). The worker input information is, for example, information indicating that that a drip infusion needle has fallen from a patient. The autonomous movable body 12 receives the input worker input information and stores the received worker identification information in the storage memory 73 (Step S14).

The autonomous movable body 12 transmits the information stored in the storage memory 73 in Steps S10, S12, and S14, as the additional information to the management server 11 (Step S15), and the management server 11 receives the additional information (Step S16). The additional information includes the state information detected by the state sensor 61, the worker identification information read by the ID reader 63, and the worker input information input from the man-machine interface 65.

As shown in FIG. 6, the management server 11 diagnoses the state of the work site P based on the received additional information (Step S17). The database 25 of the management server 11 stores a correspondence relation between the input information and the support information for supporting the medical work. The input information includes, for example, the state basic information and the state additional information. The additional information includes the state detail information and the worker attribute information. The state basic information is information obtained from the detection signal of the work field sensor 4. As one example, the state basic information is information indicating that a nurse call has been transmitted.

The state detail information includes information obtained from the detection signal of the state sensor 61 of the autonomous movable body 12. The state detail information may include information which has been input through the autonomous movable body 12 by the worker 105 who has directly confirmed the state of the work site P. Examples of the state detail information include information indicating that there is no drip infusion fluid and information indicating that a drip infusion needle has fallen from a patient. The worker attribute information includes information obtained from the worker identification information read by the ID reader 63 of the autonomous movable body 12. Examples of the worker attribute information include a qualification and skill level of the worker.

The management server 11 refers to the database 25 and determines based on the input information the support information for supporting the medical work. The processor 21 determines the support information based on the state basic information obtained from the work field sensor 104 and the additional information obtained from the autonomous movable body 12. As one example, the processor 21 determines the procedure of the medical work as the support information based on the state basic information indicating that a nurse call has been transmitted, the state detail information including information indicating that there is no drip infusion fluid and information indicating that a drip infusion needle has fallen from a patient, and the worker identification information. For example, the support information may include an instruction for disinfecting an arm of a patient, an instruction for replacing a drip infusion bag with a new one, an instruction for disinfecting a drip infusion needle, an instruction for resticking a drip infusion needle to an arm of a patient, and the like. When it is determined based on the worker identification information that the skill level of the worker 105 is low, the support information may include an instruction for reporting to another worker.

The management server 11 transmits the determined support information to the autonomous movable body 12 (Step S18). The autonomous movable body 12 receives the support information (Step S19) and makes the man-machine interface 65 output the support information (Step S20). The man-machine interface 65 may display the support information on a screen or may output the support information as sound. The worker 5 starts the medical work in accordance with the support information displayed on the man-machine interface 65 (Step S21).

The worker 5 performs the work by using the work articles mounted on the carry-in carrier 32 of the autonomous movable body 12. For example, as the work articles, the worker 5 uses medical tools such as syringes and hemostasis bands, medical supplies such as medicine, drip infusion bags, and gauze, and the like, which are mounted on the carry-in carrier 32. The article sensor 62 can detect the work articles which have been taken out from the carry-in carrier 32, and therefore, can recognize the work articles which have been used for the work (Step S22). The autonomous movable body 12 transmits to the management server 11 the first article information indicating the work article which has been taken out from the carry-in carrier 32 and used for the work (Step S23).

The management server 11 receives the first article information from the autonomous movable body 12 to acquire the information indicating the work article which has been used for the work (Step S24). When the after-work articles generated by the medical work performed by the worker 5 are put into the carry-out carrier 33, the after-work articles are detected by the article sensor 62. Examples of the after-work articles include replaced, empty drip infusion bags, collected blood, targets of pathological examination (such as collected organs and cells), and used gauze. When the after-work articles are put into the carry-out carrier 33, the article sensor 62 can detect the information of the after-work articles, and therefore, can recognize the after-work articles generated by the medical work (Step S25). The autonomous movable body 12 transmits to the management server 11 the second article information indicating the after-work articles which have been put in the carry-out carrier 33 (Step S26).

When the medical work is terminated (Step S28), the worker 5 performs an input of work completion to the man-machine interface 65 of the autonomous movable body 12 (Step S29). Upon reception of the input of the work completion, the autonomous movable body 12 stores as work log information in the storage memory 73, completion of the medical work instructed by the support information (Step S30). The autonomous movable body 12 transmits the work log information to the management server 11 through the movable body communicator 64 (Step S31).

The management server 11 receives the work log information from the autonomous movable body 12 (Step S32). The management server 11 stores the first article information, the second article information, and the work log information as a result log in the storage memory 23 or the database 25 (Step S33).

The autonomous movable body 12 may be utilized for attendance management. The worker 5 performs an input of attending or leaving to the man-machine interface 65 by making the ID reader 63 of the autonomous movable body 12, which is located close to the worker 5, read the identification information of the ID device possessed by the worker 5. The autonomous movable body 12 transmits input data of the attending or leaving to the management server 11. The management server 11 stores the received data of the attending or leaving in an attendance management database.

Embodiment 3

Figure 8:
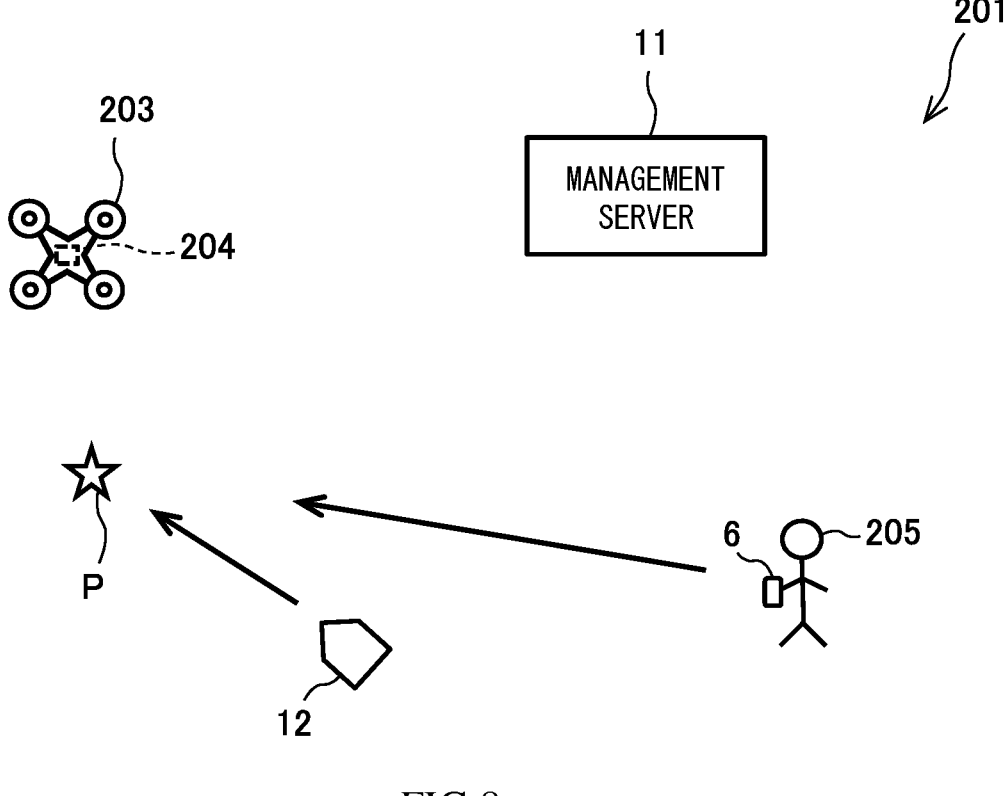
FIG. 8 is a general view of the work support system according to Embodiment 3.

FIG. 8 is a general view of a work support system 201 according to Embodiment 3. As shown in FIG. 8, the work support system 201 is a system that supports the work generated at an outdoor space 202. A work field sensor 204 is located in the outdoor space 202 and detects the occurrence of an event, such as the accident of a vehicle or the failure of outdoor equipment, which requires the work. The work field sensor 204 may be selected from a camera mounted on a drone 203, a sensor and switch located at the outdoor equipment, and the like.

The work support system 201 includes the management server 11 and the autonomous movable body 12. Since the basic functions of the management server 11 and the basic functions of the autonomous movable body 12 are the same as those in Embodiment 1, the following will be described by using the same reference signs as Embodiment 1. The management server 11 is located at a predetermined facility. The autonomous movable body 12 is movable among potential work sites in the outdoor space 202. The worker 205 may be a road service staff, a maintenance staff, or the like.

Since the processing of the work support system 201 of Embodiment 3 is similar to the processing of the work support system 1 of Embodiment 1, the processing of the work support system 101 will be described based on the flow of FIGS. 5 and 6 with suitable reference to FIGS. 2 to 4, 8, and the like. As shown in FIG. 5, to grasp the entire outdoor space 202, the management server 11 monitors the detection states of the work field sensors 204 of the drones 203 which are flying for the patrol (Step S1). The autonomous movable body 12 patrols the outdoor space 202 until the generation of the movement command that designates the destination (Step S2).

When the management server 11 receives the detection signal indicating the generation of recovery work from the work field sensor 204, the management server 11 refers to the transmission source information of the detection signal and specifies a recovery work generated site. The management server 11 specifies the recovery work generated site as the work site P (see FIG. 8) that requires the recovery work performed by the worker 205 (Step S3).

The management server 11 transmits the site information indicating the work site P to the movable body communicator 64 of the autonomous movable body 12 (Step S4). The support structure 35 of the autonomous movable body 12 receives the site information (Step S5) and generates based on the site information the movement command for making the autonomous movable body 12 autonomously move to the work site P (Step S6). The autonomous traveling structure 34 of the autonomous movable body 12 makes the autonomous movable body 12 travel to the work site P in accordance with this movement command.

The management server 11 transmits the work command for urging the worker 205 to move to the work site P, to the portable information terminal 6 possessed by the worker 205 (Step S7). The portable information terminal 6 possessed by the worker 205 receives the site information (Step S8), and the worker 205 who has seen the site information displayed on the portable information terminal 6 goes to the work site P for the recovery work (Step S9).

When the autonomous movable body 12 has arrived at the work site P, the autonomous movable body 12 detects the state information indicating the state of the work site P by the state sensor 61 (Step S10). For example, the autonomous movable body 12 stores as the state detail information in the storage memory 73 an image or video of the work site P which is taken by the camera of the state sensor 61. Then, the autonomous movable body 12 transmits this state detail information as the additional information to the management server 11. The processor 21 of the management server 11 may recognize a difference from the normal state from the received image or video by utilizing image processing technology. The information obtained from the work field sensor 204 is the state basic information, and the information obtained from the state sensor 61 is one of the pieces of state detail information. As one example, the state detail information is information indicating that a vehicle has a flat tire or information indicating that smoke is rising from outdoor equipment.

When the worker 205 has arrived at the work site P, the worker 205 inputs the worker identification information to the autonomous movable body 12 by making the ID reader 63 read the IC tag possessed by the worker 205 (Step S11). The autonomous movable body 12 receives the input worker identification information and stores the received worker identification information in the storage memory 73 (Step S12).

The worker 205 visually confirms the state of the work site P and inputs information indicating the state recognized by the visual confirmation, as the worker input information to the man-machine interface 65 of the autonomous movable body 12 (Step S13). Examples of the worker input information include information indicating that a road surface is wet, information indicating that outdoor equipment is high in temperature, and information indicating that there is an injured person. The autonomous movable body 12 receives the input worker input information and stores the received worker identification information in the storage memory 73 (Step S14).

The autonomous movable body 12 transmits the information stored in the storage memory 73 in Steps S10, S12, and S14, as the additional information to the management server 11 (Step S15), and the management server 11 receives the additional information (Step S16). The additional information includes the state information detected by the state sensor 61, the worker identification information read by the ID reader 63, and the worker input information input from the man-machine interface 65.

As shown in FIG. 6, the management server 11 diagnoses the state of the work site P based on the received additional information (Step S17). The database 25 of the management server 11 stores a correspondence relation between the input information and the support information for supporting the recovery work. The input information includes, for example, the state basic information and the state additional information. The additional information includes the state detail information and the worker attribute information. The state basic information is information obtained from the detection signal of the work field sensor 204. Examples of the state basic information include information indicating that the wheel of a vehicle has fallen into a side ditch or information indicating that an abnormal signal has been transmitted from a sensor of outdoor equipment.

The state detail information includes information obtained from the detection signal of the state sensor 61 of the autonomous movable body 12. The state detail information may include information which has been input through the autonomous movable body 12 by the worker 205 who has directly confirmed the state of the work site P. Examples of the state detail information include information indicating that a vehicle has a flat tire, information indicating that smoke is rising from outdoor equipment, information indicating that a road surface is wet, and information indicating that outdoor equipment is high in temperature. The worker attribute information includes information obtained from the worker identification information read by the ID reader 63 (see FIG. 4) of the autonomous movable body 12. Examples of the worker attribute information include a qualification and skill level of the worker.

The management server 11 refers to the database 25 and determines based on the input information the support information for supporting the recovery work. The processor 21 determines the support information based on the state basic information obtained from the work field sensor 204 and the additional information obtained from the autonomous movable body 12. As one example, the processor 21 determines the procedure of the recovery work as the support information based on the state basic information indicating that the wheel of a vehicle has fallen into a side ditch, the state detail information including information indicating that a vehicle has a flat tire and information indicating that there is an injured person, and the worker identification information. For example, the support information may include an instruction for moving the injured person to a safe place, an instruction for making the wheel get out of the side ditch by using a predetermined tool, an instruction for replacing the flat tire with an emergency tire, and the like. When it is determined based on the worker identification information that the worker 5 has a predetermined qualification, the support information may include an instruction for making the worker 5 give emergency medical treatment to the injured person.

The management server 11 transmits the determined support information to the autonomous movable body 12 (Step S18). The autonomous movable body 12 receives the support information (Step S19) and makes the man-machine interface 65 output the support information (Step S20). The man-machine interface 65 may display the support information on a screen or may output the support information as sound. The worker 205 starts the recovery work in accordance with the support information displayed on the man-machine interface 65 (Step S21).

The worker 205 performs the work by using the work articles mounted on the carry-in carrier 32 of the autonomous movable body 12. For example, as the work articles, the worker 205 uses tools, medical equipment, and the like, which are mounted on the carry-in carrier 32. The article sensor 62 can detect the work articles which have been taken out from the carry-in carrier 32, and therefore, can recognize the work articles which have been used for the work (Step S22). The autonomous movable body 12 transmits to the management server 11 the first article information indicating the work article which has been taken out from the carry-in carrier 32 and used for the work (Step S23).

The management server 11 receives the first article information from the autonomous movable body 12 to acquire the information indicating the work article which has been used for the work (Step S24). When the after-work articles generated by the recovery work performed by the worker 205 are put into the carry-out carrier 33, the after-work articles are detected by the article sensor 62. The after-work articles are, for example, used medical equipment and the like. When the after-work articles are put into the carry-out carrier 33, the article sensor 62 can detect the information of the after-work articles, and therefore, can recognize the after-work articles generated by the recovery work (Step S25). The autonomous movable body 12 transmits to the management server 11 the second article information indicating the after-work article which has been put in the carry-out carrier 33 (Step S26). The management server 11 receives the second article information (Step S27).

When the recovery work is terminated (Step S28), the worker 205 performs an input of work completion to the man-machine interface 65 of the autonomous movable body 12 (Step S29). Upon reception of the input of the work completion, the autonomous movable body 12 stores as work log information in the storage memory 73, completion of the recovery work instructed by the support information (Step S30). The autonomous movable body 12 transmits the work log information to the management server 11 through the movable body communicator 64 (Step S31).

The management server 11 receives the work log information from the autonomous movable body 12 (Step S32). The management server 11 stores the first article information, the second article information, and the work log information as a result log in the storage memory 23 or the database 25 (Step S33).

Each of the above embodiments describes an example in which the work support system is applied to the work generated in a region, such as a factory, a hospital, or an outdoor space. However, the work support system may be applied to the work generated in the other regions. For example, the work support system may be applied to physical distribution warehouses, offices, hotels, retail stores, restaurants, smart cities, fire fighting activities, disaster relief activities, social infrastructures, agriculture, forestry, fishery, and the like.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

REFERENCE SIGNS LIST 1, 101, 201 work support system
5, 105, 205 worker
6 portable information terminal
11 management server
12 autonomous movable body
21 processor
32 carry-in carrier
33 carry-out carrier
61 state sensor
64 movable body communicator
65 man-machine interface
71 processor
P work site

The invention claimed is:

1. A work support system comprising:
a management server including server processing circuitry; and
an autonomous movable body including
movable body processing circuitry, a movable body communicator electrically connected to the movable body processing circuitry and communicable with the management server, and
a man-machine interface electrically connected to the movable body processing circuitry, wherein:
the server processing circuitry is configured to
determine a work site that requires work,
transmit site information indicating the work site, to the movable body communicator,
acquire identification information by which a worker is identifiable, and
determine support information including content corresponding to an attribute of the worker acquired from the identification information, the attribute comprising at least one of a qualification or skill level of the worker, or a physical body parameter of the worker; and
the movable body processing circuitry is configured to
receive the site information from the management server through the movable body communicator,
generate based on the site information a movement command for making the autonomous movable body autonomously move to the work site,
acquire the support information for the work to be performed by the worker at the work site, and
output the support information to the worker through the man-machine interface when the autonomous movable body has arrived at the work site.

2. The work support system according to claim 1, wherein:
the movable body processing circuitry is configured to transmit additional information to the management server;
the server processing circuitry is configured to
determine the support information based on the additional information and
transmit the support information to the movable body communicator; and
the movable body processing circuitry is configured to receive the support information through the movable body communicator.

3. The work support system according to claim 2, wherein:
the autonomous movable body further includes a state sensor that detects state information indicating a state of the work site; and
the additional information includes the state information detected by the state sensor when the autonomous movable body has arrived at the work site.

4. The work support system according to claim 2, wherein:
the movable body processing circuitry is configured to receive worker input information input to the man-machine interface by the worker when the autonomous movable body has arrived at the work site; and
the additional information includes the worker input information.

5. The work support system according to claim 2, wherein:
the additional information includes the identification information.

6. The work support system according to claim 1, wherein the autonomous movable body further includes a carry-in carrier on which a work article to be used for the work is mounted.

7. The work support system according to claim 6, wherein the movable body processing circuitry is configured to receive information of the work article and transmit to the management server, information of the work article which has been used for the work.

8. The work support system according to claim 1, wherein the autonomous movable body further includes a carry-out carrier on which an after-work article generated by the work is mounted.

9. The work support system according to claim 8, wherein the movable body processing circuitry is configured to receive information of the after-work article and transmit the information of the after-work article to the management server.

10. The work support system according to claim 1, wherein:

the autonomous movable body further includes a storage memory; and the movable body processing circuitry is configured to store in the storage memory, work log information indicating the work which has been performed by the worker and transmit the work log information to the management server through the movable body communicator.

11. The work support system according to claim 1, wherein the server processing circuitry is configured to transmit to an information terminal a work command for urging the worker to move to the work site.

12. The work support system according to claim 1, wherein the movable body processing circuitry is configured to generate a patrol command when the movement command is not being generated, the patrol command being a command for making the autonomous movable body patrol a predetermined region.

13. An autonomous movable body for work support, the autonomous movable body comprising:

movable body processing circuitry;

a movable body communicator electrically connected to the movable body processing circuitry and communicable with a management server; and a man-machine interface electrically connected to the movable body processing circuitry, wherein the movable body processing circuitry is configured to receive site information indicating a work site that requires work, from the management server through the movable body communicator, generate based on the site information a movement command for making the autonomous movable body autonomously move to the work site, acquire identification information by which a worker is identifiable, transmit the identification information to the management server, wherein the management server determines support information including content corresponding to an attribute of the worker acquired from the identification information, the attribute comprising at least one of a qualification or skill level of the worker, or a physical body parameter of the worker, receive, from the management server, the support information including content corresponding to the attribute of the worker for supporting the work at the work site, and output the support information to the worker through the man-machine interface when the autonomous movable body has arrived at the work site.

14. A work support method comprising:

receiving, from a management server, site information indicating a work site that requires work;

based on the site information indicating the work site, generating a movement command for making an autonomous movable body autonomously move to the work site;

acquiring identification information by which a worker is identifiable, transmitting the identification information to the management server, wherein the management server determines support information including content corresponding to an attribute of the worker acquired from the identification information, the attribute comprising at least one of a qualification or skill level of the worker, or a physical body parameter of the worker, receiving, from the management server, the support information including content corresponding to the attribute of the worker for supporting the work at the work site; and outputting the support information to the worker through a man-machine interface of the autonomous movable body when the autonomous movable body has arrived at the work site.

15. The work support method according to claim 14, wherein:

the worker is a specific worker;

the autonomous movable body is movable among sites in a predetermined region where workers including the specific worker exist; and the method further comprises determining the work site by determining whether or not a site of the sites requires work.

* * * * *